US012681471B2

(12) United States Patent
Kluwe et al.

(10) Patent No.: US 12,681,471 B2
(45) Date of Patent: Jul. 14, 2026

(54) METHOD AND APPARATUS FOR CONTROLLING A PROCESS

(71) Applicant: Infineon Technologies AG, Neubiberg (DE)

(72) Inventors: Andreas Kluwe, Radebeul (DE); Stefan Jank, Dresden (DE); Christian Knöll, Dresden (DE)

(73) Assignee: Infineon Technologies AG, Neubiberg (DE)

( * ) Notice: Subject to any disclaimer, the term of this patent is extended or adjusted under 35 U.S.C. 154(b) by 406 days.

(21) Appl. No.: 18/349,581

(22) Filed: Jul. 10, 2023

(65) Prior Publication Data

US 2024/0019858 A1 Jan. 18, 2024

(30) Foreign Application Priority Data

Jul. 18, 2022 (DE) .......................... 102022117924.9

(51) Int. Cl.
*G05B 23/02* (2006.01)

(52) U.S. Cl.
CPC ....... *G05B 23/024* (2013.01); *G05B 23/0221* (2013.01)

(58) Field of Classification Search
CPC .............. G05B 23/024; G05B 23/0221; G05B 23/0235
See application file for complete search history.

(56) References Cited

U.S. PATENT DOCUMENTS

| | | | | |
|---|---|---|---|---|
| 6,718,221 B1 * | 4/2004 | Stromberg | ............ | G06F 18/214 |
| | | | | 700/109 |
| 6,980,875 B1 * | 12/2005 | Stromberg | ............. | G06Q 10/04 |
| | | | | 700/109 |
| 9,798,320 B2 | 10/2017 | Kang et al. | | |
| 2014/0249656 A1 | 9/2014 | Kang et al. | | |
| 2022/0334569 A1 * | 10/2022 | Moradian | ........ | G05B 19/41885 |
| 2023/0236586 A1 * | 7/2023 | Cheon | ................ | G05B 13/0265 |
| | | | | 700/110 |

FOREIGN PATENT DOCUMENTS

| | | | | |
|---|---|---|---|---|
| CN | 101458513 A | 6/2009 | | |
| CN | 105700518 B * | 6/2018 | .......... | G05B 23/024 |
| EP | 1540535 A1 | 6/2005 | | |

OTHER PUBLICATIONS

Machine translation of CN 105700518 B to Zheng et al. (Year: 2018).*

(Continued)

*Primary Examiner* — Mi'schita' Henson
(74) *Attorney, Agent, or Firm* — Murphy, Bilak & Homiller, PLLC

(57) ABSTRACT

A computer-implemented method of monitoring a process includes obtaining a sample data distribution. The sample data represents one or more parameters of a process. The sample data is collected by one or a plurality of sampling units. The method further includes calculating a control limit based on an evaluation of at least one difference of percentiles near an upper edge of the sample data distribution or a lower edge of the sample data distribution.

21 Claims, 5 Drawing Sheets

(56) References Cited

OTHER PUBLICATIONS

Al-Lami et al., A parametric bootstrap control chart for Lindley Geometric percentiles, Feb. 6, 2025, PLOS ONE 20(2), pp. 1-29: e0316449. https://doi.org/10.1371/journal.pone.0316449 (Year: 2025).*

Zeng et al., Anomaly Detection Methods for Nonparametric Fitting Gaussian Mixture Distributions for Data Features, 2024, IEEE 2024 International Conference on Industrial IoT, Big Data and Supply Chain (IloTBDSC), pp. 197-206, DOI: 10.1109/IloTBDSC64371.2024.00044 (Year: 2024).*

Chakraborti, Subhabrata, et al., "A nonparametric control chart based on the Mann-Whitney statistic", IMS Collections; Beyond Parametrics in Interdisciplinary Research: Festschrift in Honor of Professor Pranab K. Sen; vol. 1, 2008, pp. 156-172.

Goswami, Ajit, et al., "Some Studies on Normal and Non-Normal Process Capability Indices", International Journal of Mathematics and Statistics Invention (IJMSI), E-ISSN: 2321-4767 P-ISSN: 2321-4759, www.ijmsi.org vol. 1 Issue 2, Dec. 2013, pp. 31-40.

* cited by examiner s = 0.5 multimodal asymmetric quantized

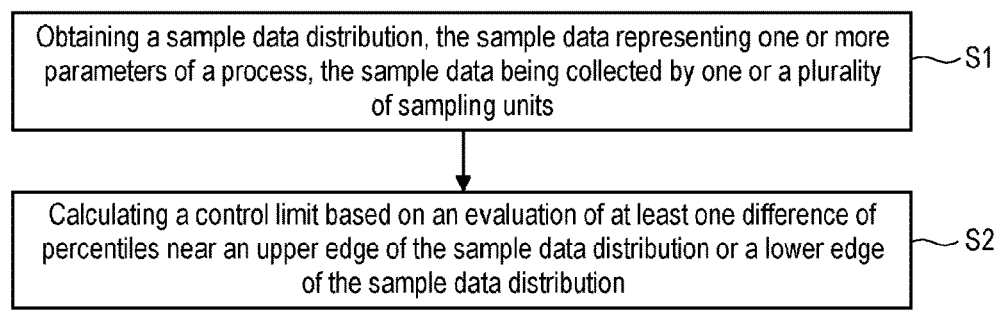

Obtaining a sample data distribution, the sample data representing one or more parameters of a process, the sample data being collected by one or a plurality of sampling units　　～S1

Calculating a control limit based on an evaluation of at least one difference of percentiles near an upper edge of the sample data distribution or a lower edge of the sample data distribution　　～S2

Fig. 5

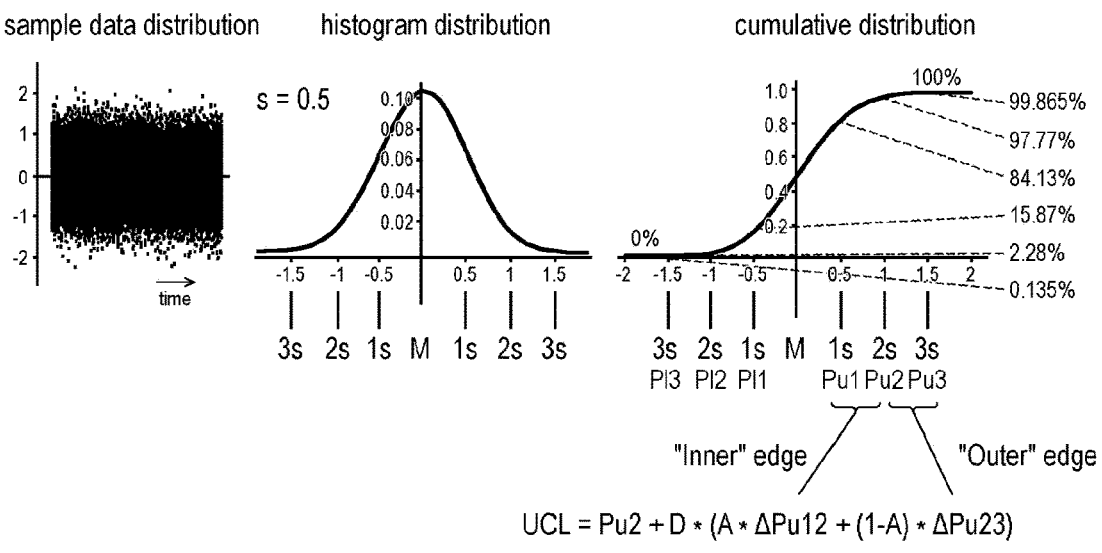

sample data distribution　　histogram distribution　　cumulative distribution $$UCL = Pu2 + D * (A * \Delta Pu12 + (1-A) * \Delta Pu23)$$

Fig. 6

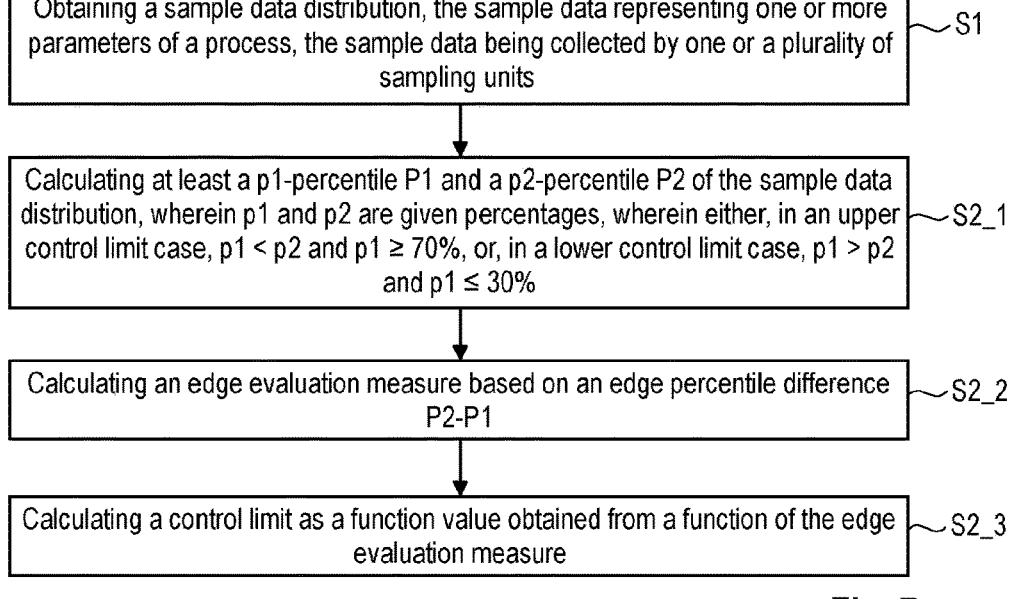

Obtaining a sample data distribution, the sample data representing one or more parameters of a process, the sample data being collected by one or a plurality of sampling units　　～S1

Calculating at least a p1-percentile P1 and a p2-percentile P2 of the sample data distribution, wherein p1 and p2 are given percentages, wherein either, in an upper control limit case, p1 < p2 and p1 ≥ 70%, or, in a lower control limit case, p1 > p2 and p1 ≤ 30%　　～S2_1

Calculating an edge evaluation measure based on an edge percentile difference P2-P1　　～S2_2

Calculating a control limit as a function value obtained from a function of the edge evaluation measure　　～S2_3

Fig. 7

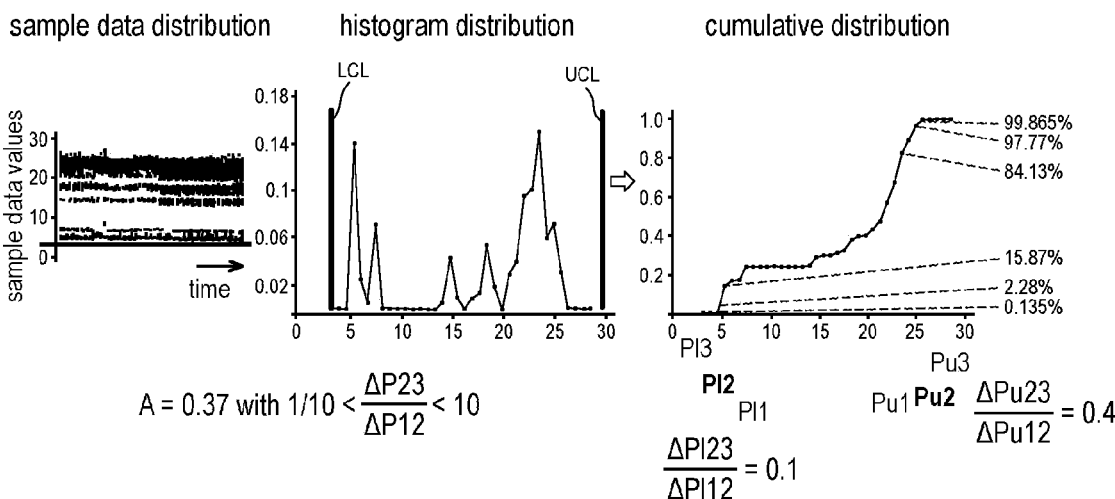

$$A = 0.37 \text{ with } 1/10 < \frac{\Delta P23}{\Delta P12} < 10$$

$$\frac{\Delta Pl23}{\Delta Pl12} = 0.1$$

$$\frac{\Delta Pu23}{\Delta Pu12} = 0.4$$

$$UCL = Pu2 + D * (0.37 * \Delta Pu12 + (1-0.37) * \Delta Pu23)$$

Fig. 8

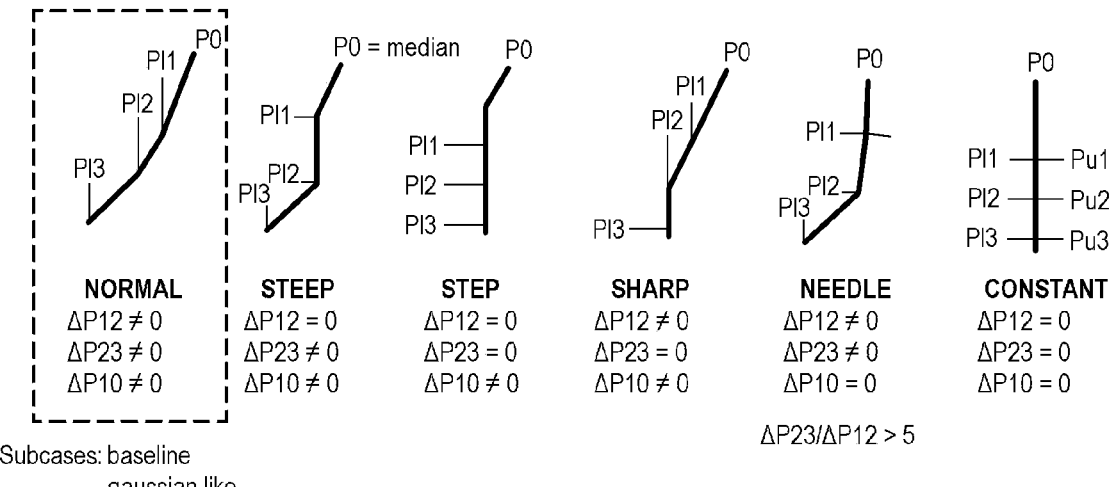

NORMAL
$\Delta P12 \neq 0$
$\Delta P23 \neq 0$
$\Delta P10 \neq 0$

STEEP
$\Delta P12 = 0$
$\Delta P23 \neq 0$
$\Delta P10 \neq 0$

STEP
$\Delta P12 = 0$
$\Delta P23 = 0$
$\Delta P10 \neq 0$

SHARP
$\Delta P12 \neq 0$
$\Delta P23 = 0$
$\Delta P10 \neq 0$

NEEDLE
$\Delta P12 \neq 0$
$\Delta P23 \neq 0$
$\Delta P10 = 0$

CONSTANT
$\Delta P12 = 0$
$\Delta P23 = 0$
$\Delta P10 = 0$ $\Delta P23/\Delta P12 > 5$ Subcases: baseline
gaussian like
extreme

Fig. 9

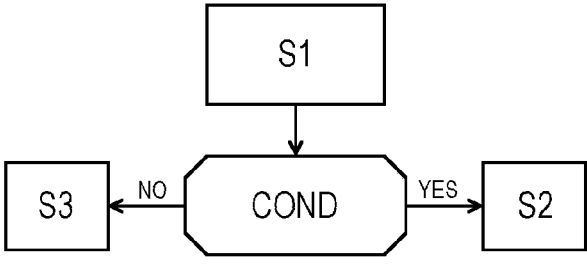

Fig. 10

METHOD AND APPARATUS FOR CONTROLLING A PROCESS

TECHNICAL FIELD

This disclosure relates generally to statistical process monitoring, and more particularly to the technique of monitoring processes with complex, non-Gaussian data distributions, for example.

BACKGROUND

In industrial processes, such as manufacturing processes, process parameters are monitored to detect changes in the process for, e.g., the purpose of process control. To this end, sample data of the process is collected and the distribution of the sample data is statistically evaluated. A basic method is to derive limits on the sample data distribution that trigger an alarm or a control action. These limits should be chosen to allow for an early response while avoiding too many premature responses (e.g. false alarms, too early control actions, etc.). The best balance is usually obtained by a statistically calculated limit.

There are many different approaches in the field of statistical process control (SPC) to calculate such limits. Usually, the sample data distribution is modeled to known distributions, and the limits are calculated based on characteristic quantities (such as mean value, standard deviation, etc.) of the sample data distribution or the modeled sample data distribution.

Sample data distributions occurring in practice are often not random but contain systematic components, i.e. they are not normally distributed. Especially for such distributions it is difficult to derive appropriate limits for process monitoring/control based on conventional statistics and/or modeling.

SUMMARY

According to an aspect of the disclosure, a computer-implemented method of monitoring a process comprises of obtaining a sample data distribution, the sample data representing one or more parameters of a process, the sample data being collected by one or a plurality of sampling units. A control limit is calculated based on an evaluation of at least one difference of percentiles near an upper edge of the sample data distribution or a lower edge of the sample data distribution.

According to a further aspect of the disclosure, a computer-implemented method of monitoring a process comprises obtaining a sample data distribution, the sample data representing one or more parameters of a process, the sample data being collected by one or a plurality of sampling units. At least a p1-percentile P1 and a p2-percentile P2 of the sample data distribution are calculated, wherein p1 and p2 are given percentages. In an upper control limit case, $p1 < p2$ and $p1 \geq 70\%$, or, in a lower control limit case, $p1 > p2$ and $p1 \leq 30\%$. An edge evaluation measure is calculated based on at least one difference of percentiles $P2-P1$. A control limit is calculated which is based on a sum of a ps-percentile Ps of the sample data distribution and the edge evaluation measure, wherein ps is a given percentage.

According to a further aspect of the disclosure, a data processing apparatus comprises means for carrying out one of the methods described above.

According to a further aspect of the disclosure, a system comprises one or a plurality of sampling units configured to collect sample data representing one or more parameters of a process, and a data processing apparatus comprising means for carrying out one of the methods described above.

According to a further aspect of the disclosure, a computer program comprises program instructions which, when the program is executed by a computer, cause the computer to carry out one of the methods described above.

According to a further aspect of the disclosure, a non-transitory computer-readable storage medium comprises program instructions which, when executed by a computer, cause the computer to carry out one of the methods described above.

BRIEF DESCRIPTION OF THE DRAWINGS

In the drawings, like reference numerals designate corresponding similar parts. The features of the various illustrated embodiments can be combined unless they exclude each other and/or can be selectively omitted if not described to be necessarily required. Embodiments are depicted in the drawings and are exemplarily detailed in the description which follows.

FIG. 5 is a flowchart illustrating stages of an exemplary computer-implemented method of monitoring a process.

FIG. 6 illustrates the normally distributed sample data distribution of FIG. 1 and a diagram representing the cumulative sample data distribution thereof.

FIG. 7 is a flowchart illustrating stages of an exemplary computer-implemented method to derive a control limit.

FIG. 8 illustrates diagrams representing an exemplary non-normally distributed sample data distribution by showing sample data values over time, the frequency of occurrence of sample data values (histogram), and the cumulative sample data distribution thereof.

FIG. 9 illustrates a number of different edge progression types of sample data distributions.

FIG. 10 is a flowchart illustrating stages of an exemplary computer-implemented method of monitoring a process including edge progression characterization.

DETAILED DESCRIPTION

It is to be understood that the features of the various exemplary embodiments and examples described herein may be combined with each other unless specifically noted otherwise.

Figure 1:
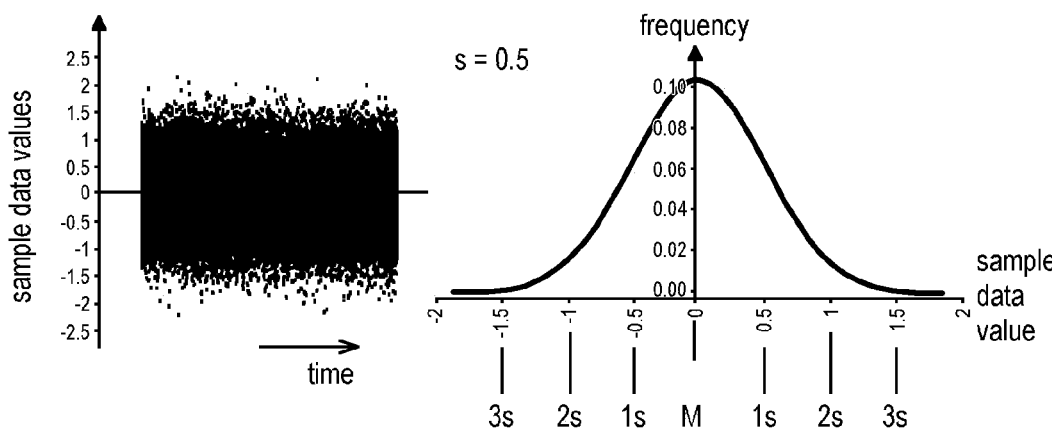
FIG. 1 illustrates diagrams representing a normal-distributed sample data distribution by showing sample data values over time (left side) and the frequency of occurrence of sample data values (histogram, right side).

FIG. 1 illustrates a normally distributed sample data distribution over time (left side) and over sample data values (right side). In the diagram on the left side of FIG. 1, the obtained (e.g. measured) sample data values are plotted on the Y-axis, while the time is shown on the X-axis. In the diagram on the right side of FIG. 1, the Y-axis illustrates the frequency of occurrence of obtained sample data plotted versus its values along the X-axis of the diagram (histogram).

The "idealistic" example of a normally distributed sample data distribution is intended to explain a conventional method of calculating control limits based on the obtained sample data distribution. The conventional method has limited applicability to non-normally distributed sample data distributions.

A straight-forward approach to compute control limits based on the obtained sample data distribution is to calculate characteristic quantities of the sample data distribution such as, e.g., its mean value and/or its standard deviation. These and other quantities of the obtained sample data distribution may be used to model a sample data distribution from the obtained sample data distribution and to derive control limits (e.g. lower control limit LCU and upper control limit UCL) from the modeled sample data distribution.

The challenge in deriving the control limits is to find the best compromise in deciding between an acceptable behavior of the monitored system and a behavior, which requires an external reaction or intervention by a control unit or an operator of the monitored system. The control limit should not be too close to the center of the sample data distribution to avoid false alarms or premature control actions, but should also not be too far from the center of the sample data distribution to allow early control or alarm reaction.

Referring to FIG. 1, a simple conventional method of calculating the upper control limit UCL and/or the lower control limit LCL is given by $$UCL=M+X\times s$$

$$LCL=M-X\times s. \qquad \text{(equation 1)}$$

Equation 1 uses the mean value M and the standard deviation s of the obtained sample data distribution. X is a factor (usually an integer) by which the upper control limit UCL and/or the lower control limit LCL can be scaled to appropriate values. For example, with X=6, a 6 times standard deviation limit is set as the UCL and/or the LCL. This control limit is sometimes referred to as the "6 sigma limit" in the art.

While statistically calculated control limits usually provide the best balance between avoiding too many false alarms and allowing early reaction, modeling of the sample data distribution is often not feasible with complex distributions which are frequent cases in practice. A variety of practical, non-normally distributed sample data distributions is illustrated in FIGS. 2 to 4.

Figure 2:
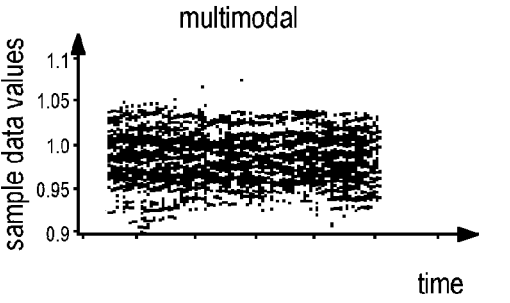
FIG. 2 is a diagram showing sample data values over time of an exemplary multimodal sample data distribution.

Referring to FIG. 2, a multimodal and time variant sample data distribution is shown. A multimodal sample data distribution is a distribution with a plurality of peaks. Multimodal sample data distributions may, e.g., be obtained when data of different sampling units (e.g. sensors, measurement units, etc.) is combined, wherein the sampling units have, e.g., a measurement or output offset from each other. In addition, many other causes for the occurrence of systematic components or errors in collected sample data are known in the art. The exemplary sample data distribution is time variant as it changes over time. Time may, e.g., be measured in units of hours or days or weeks or months, i.e. slow time variations may, e.g., be monitored.

Figure 3:
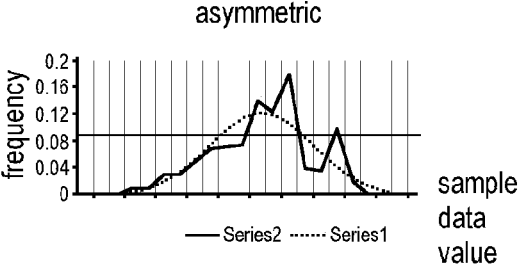
FIG. 3 is a diagram showing an exemplary asymmetric sample data distribution.

FIG. 3 illustrates another example of a practical sample data distribution. Rather than being normally distributed, the sample data distribution has an asymmetric shape.

Figure 4:
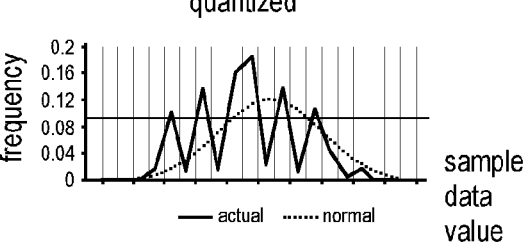
FIG. 4 is a diagram showing an exemplary quantized sample data distribution.

FIG. 4 illustrates a sample data distribution which is quantized. Quantized sample data distributions can result from, for example, low resolution of measurement equipment, electronic quantization, or other systematic effects such as stepwise adjustments of control equipment that are reflected in the collected sample data.

The asymmetric sample data distributions of FIG. 3 and/or the quantized sample data distribution of FIG. 4 may also be multimodal distributions.

Statistical process control (SPC), as disclosed herein, shall be able to cope with virtually all conceivable sample data distributions. According to an aspect of the disclosure, the control limits to be calculated shall not be based on modeling the sample data distribution based on the obtained sample data and/or a-priori information. Rather, the control limits can be directly derived from input sample data alone by the approaches described in more detail further below. This allows to process high amounts of input sample data without relying on any assumptions with regard to data acquisition, data processing and/or the cause or behavior of any possible systematic errors in the obtained sample data. In other words, the sample data may be evaluated "blindly" without biasing the evaluation on a model.

In particular, the approaches described herein may, e.g., not require calculation of the mean value and/or the standard deviation of the obtained sample data distribution.

Referring to FIG. 5, a computer-implemented method of monitoring a process includes, at S1, obtaining a sample data distribution, wherein the sample data represents one or more parameters of a process. The sample data may have been collected by one or a plurality of sampling units.

At S2 a control limit is calculated based on an evaluation of at least one difference of percentiles near an upper edge (upper end) of the sample data distribution or a lower edge (lower end) of the sample data distribution.

Differently stated, the process described above relies on an edge analysis of the obtained sample data distribution by using at least one difference of percentiles near the edge of the distribution. Using this edge analysis, statistically derived control limits allowing sensitive (or "early") control at a low false alarm rate may be calculated for virtually any kind of distribution.

The (at least two) percentiles near the upper edge of the sample data distribution may be greater than a 70%-percentile of the sample data distribution. Analogously the percentiles near the lower edge of the sample data distribution may be less than a 30%-percentile of the sample data distribution. In other examples of edge analysis, the (at least two) percentiles used for edge analysis near the upper edge may be greater than the 75%-percentile or the 80%-percentile or the 85%-percentile, and/or the percentiles used for edge analysis near the lower edge of the sample data distribution may be less than the 25%-percentile or the 20%-percentile or the 15%-percentile.

Percentiles may (but do not need to) be calculated based on a cumulative sample data distribution of the obtained sample data distribution. A p-percentile equals the sample data value at a given percentage p of the cumulative sample data distribution. That is, using the cumulative sample data distribution, an easy way to calculate a p-percentile is to identify the smallest sample data value which is equal to or greater than p (which is a percentage) of the sample data values obtained. In the following, the p-percentile is denoted by P. If, for example, p is 99%, P is a sample data value at 99% of the cumulative sample data distribution, i.e. a sample data value which is usually (but not necessarily) very close to the upper end of the upper edge of the sample data distribution.

The at least two percentiles near an edge of the sample data distribution are denoted as p1-percentile P1 and p2-percentile P2, with p1 and p2 are given percentages. The p1-percentile P1 may then be calculated as the sample data value at p1 of the cumulative sample data distribution and the p2-percentile P2 may be calculated as the sample data value at p2 of the cumulative sample data distribution.

It is to be noted that the difference of percentiles characterizes the progression of the sample data distribution near its edge. The smaller the difference for given percentages p1, p2, the steeper is the edge progression of the sample data distribution between p1 and p2 of the cumulative sample data distribution.

By relying on differences of percentiles near the edges of the sample data distribution, the sample data distribution may, e.g., be evaluated only in its edge region(s). For example, in the upper control limit case, the sample data distribution may be evaluated only in a region equal to or greater than 70% or 75% or 80% or 85% of the cumulative sample data distribution. As a consequence the sample data distribution for sample data values below the corresponding percentiles is, in this example, not used for the calculation of the upper control limit. Stated differently, the same upper control limit UCL is derived for sample data distributions of arbitrary shape below the smaller of the two percentiles P1, P2. Analogously, in the lower control limit case, the sample data distribution may, e.g., be evaluated only in a region equal to or less than 30% or 25% or 20% or 15% of the cumulative sample data distribution, with the effect that the sample data distribution for sample data values above the corresponding percentiles does not affect the outcome of the calculation of the lower control limit LCL. That way, the approach described herein is "robust" to variations of the sample data distribution in its inner region (e.g. around its median, which is the 50%-percentile). In general, however, it is also possible for percentiles near the central region of the sample data distribution to be used to calculate the control limits, provided that the edge evaluation method described herein is applied that is based on at least one percentile difference located at the edge (region) of the sample data distribution.

Referring to FIG. 6, the concept of evaluating edge regions of the sample data distribution is illustrated for the (idealistic) case of a normally distributed sample data distribution. The cumulative sample data distribution is depicted on the right side of FIG. 6.

As a specific example and without loss of generality, three percentages p1, p2 and p3 are given to define p1-percentile P1, p2-percentile P2 and p3-percentile P3. The percentage values p1, p2 and p3 are, in this specific example, chosen such that the percentiles P1, P2 and P3 are spaced apart from the mean value M of a normal distribution by $1s$, $2s$ and $3s$, respectively (s is the standard deviation). That is, in the upper control limit case, Pu1 equals the sample data value at 84.13%, Pu2 equals the sample data value at 97.77% and Pu3 equals the sample data value at 99.865% of the cumulative sample data distribution. Analogously, Pl1 equals the sample data value at 15.87%, Pl2 equals the sample data value at 2.28% and Pl3 equals the sample data value at of the cumulative sample data distribution.

It is to be noted that the percentages p1, p2, p3 used to define the percentiles P1, P2, P3 can be chosen differently. In particular, they can but need not be chosen such that the differences of percentiles for a normal distribution are equal to the standard deviation s and/or are identical.

In one example the percentages p1, p2, p3 may be chosen such that for a normal distribution, the differences of percentiles P2–P1 and P3–P2 are equal (but may be different from s).

In another example the percentages p1, p2, p3 may be chosen such that for a normal distribution, the differences of percentiles P2–P1 and P3–P2 are different from each other.

Returning to the specific example of FIG. 6, the following differences of percentiles are illustrated. If no lower case index u or 1 is used in the equations, the equations apply to both the upper and the lower control limit case.

$$\Delta P12 = P2 - P1$$

$$\Delta P23 = P3 - P2$$

$$\Delta P13 = P3 - P1 \qquad \text{(equation 2)}$$

The control limit CL may, e.g., be calculated according to one of the following equations:

$$CL = Ps + D \times \Delta P12 \qquad \text{(equation 3.1)}$$

$$CL = Ps + D \times \Delta P23 \qquad \text{(equation 3.2)}$$

$$CL = Ps + D/2 \times \Delta P13 \qquad \text{(equation 3.3)}$$

wherein D is a control limit adjustment factor and Ps is a starting point percentile for calculation.

First, compared to equation 1, equations 3.1-3.3 use a starting point ps-percentile Ps near the respective upper edge (hereafter denoted Pus) or lower edge (hereafter denoted Pls) of the distribution instead of a mean value M as the starting point for calculating the upper and lower control limits. For example, in the case of the upper control limit, ps=pus may, e.g., be a given percentage≥80%, or, in the case of the lower control limit, ps=pls may, e.g., be a given percentage ≤20%. In a specific example Pus=Pu2, which is the sample data value at pu2 (e.g. 97.77%) of the cumulative distribution, and Pls=Pl2, which is the sample data value at pls (e.g. 2.28%) of the cumulative distribution.

All equations 3.1, 3.2, 3.3 yield the same control limits for a normal distribution. More specifically, for a normal distribution, Pu2=M+2s and P12=M−2s. Further, $\Delta Pu12 = \Delta Pu23 = s$ and $\Delta Pu13 = 2s$, and $\Delta P112 = \Delta P123 = -s$ and $\Delta P113 = -2s$. Therefore, both for the upper and lower control limit case, the same upper and lower control limits UCL, LCL are set for a normal sample data distribution as in equation 1. If, e.g., D=4, all equations 3.1, 3.2, 3.3 yield the "6 sigma limit" of equation 1 for a normal sample data distribution.

More specifically, the upper control limit UCL and the lower control limit LCL may be written from equations 3.1 to 3.3 as follows:

$$UCL = Pus + D \times (Pu2 - Pu1) = Pus + D \times \Delta P12 \qquad \text{(equation 4.1)}$$

$$UCL = Pus + D \times (Pu3 - Pu2) = Pus + D \times \Delta P23 \qquad \text{(equation 4.2)}$$

$$UCL = Pus + D/2 \times (Pu3 - Pu1) = Pus + D/2 \times \Delta P13 \qquad \text{(equation 4.3)}$$

$$LCL = Pls - D \times (Pl1 - Pl2) = Pls + D \times \Delta P12 \qquad \text{(equation 4.4)}$$

$$LCL = Pls - D \times (Pl2 - Pl3) = Pls + D \times \Delta P23 \qquad \text{(equation 4.5)}$$

$$LCL = Pls - D/2 \times (Pl1 - Pl3) = Pls + D/2 \times \Delta P13 \qquad \text{(equation 4.6)}$$

However, for sample data distributions other than a normal distribution, the results of equations 3.1 to 3.3 and 4.1 to 4.6 differ both from the results of equation 1 and from one another.

The equations 3.1 to 3.3 and 4.1 to 4.6 do not rely on calculating a mean value M or a standard deviation s of the obtained sample data distribution. Rather, a starting percentile Ps close to the upper edge (Pus) and/or the lower edge (Pls) of the sample data distribution is defined by selecting an appropriate percentage ps (pus and/or pls, respectively), and at least one difference of percentiles is calculated at the respective edge of the sample data distribution.

Referring to FIG. 7, the stage S2 of FIG. 5 may comprise sub-stages S2_1, S2_2 and S2_3. At S2_1, at least a p1-percentile P1 and a p2-percentile P2 of the sample data distribution is calculated, wherein p1 and p2 are given percentages, wherein either, in an upper control limit case, p1<p2 and p1≥70%, or, in a lower control limit case, p1>p2 and p1≤30%. At S2_2, the method may comprise calculating an edge evaluation measure based on at least one difference of percentiles P2− P1. At S2_3, a control limit is calculated based on a sum of a ps-percentile Ps of the sample data distribution and the edge evaluation measure, wherein ps is a given percentage.

The left portion and middle portion of FIG. 8 show a sample data distribution that is far from a normal distribution. For example, the sample data distribution may represent the measured position of a throttle valve during CVD (chemical vapor deposition) fabrication of semiconductor chips. However, many sampling units or sample data sources other than a throttle valve position sensor are possible. Sample data can be generated (e.g. as measured raw data and/or preprocessed measured raw data) by any sampling units, and the information provided by the sample data can be arbitrary and may encompass a wide variety of industries or technologies. The sample data represents the one or more process parameters, for example, by being based on or indicative of measured parameter values that occur during the process operation.

Optional preprocessing of measured raw data (e.g. sensor data) may include, for example, evaluating the raw data for characteristics such as mean, sigma, range, minimum, maximum, and so forth. The sample data is then the characteristics rather than the measured raw data (e.g. sensor data).

No specific assumptions or a-priory information about the sampling unit(s), which provide for the sample data, and/or the sample data are required or used. Further, the sample data may be provided by more than one sampling unit, resulting, e.g., in sample data having systematic errors and/or different bias (e.g. offsets). As shown in the left portion and middle portion of FIG. 8, the sample data distribution may, e.g., be a multimodal and/or (slightly) time variant distribution.

UCL and LCL, as shown in FIG. 8, are calculated using the edge progression evaluation method described herein. Conventional 6-sigma UCL and LCL calculated using equation 1 with X=6 would be far away from the distribution due to an overblown sigma. These conventional limits are not suitable in practice as control limits for this type of sample data distribution.

The cumulative sample data distribution is shown on the right side of FIG. 8. As mentioned above, percentiles may be defined by percentages p11, p12, p13 (lower limit case) and pu1, pu2, pu3 (upper limit case) of the normal distribution with s spacing, for example.

In general, equations 3.1 to 3.3 may be written as $$CL(EEM)=Ps+D\times EEM \qquad \text{(equation 5)}$$

wherein EEM is an edge evaluation measure. In equations 3.1 to 3.3, the EEM is calculated by a difference of (only) two percentiles. As mentioned above, scaling may be set by, e.g., D=4.

However, more than two percentiles may be used for constituting the EEM (i.e. the EEM for the upper edge case and/or the EEM for the lower edge case). For example, two differences of percentiles, namely $\Delta P12$ and $\Delta P23$, may be used for edge evaluation at each edge. Further, a weighting between $\Delta P12$ and $\Delta P23$ may be used. For example, the EEM may be expressed by $$EEM=A\times\Delta P12+(1-A)\times\Delta P23 \qquad \text{(equation 6)}$$

with A being a weight between 0 and 1. Here, $\Delta P12$ is referred to as the "inner" edge percentile difference and $\Delta P23$ is referred to as the "outer" edge percentile difference (both for the upper edge case and the lower edge case). The use of two or more percentile differences for the evaluation of the edge region(s) of a sample data distribution allows for more sensitive and meaningful evaluation results.

For example, p1, p2, p3 may be chosen such that $\Delta P23/\Delta P12=1$ for a normal distribution.

A may be a constant value at least for sample data distributions meeting the condition $1/x\leq(\Delta P23/\Delta P12)\leq x$, with x being equal to or greater than 5 or 10. Here, A may be the same constant value for the upper edge case and the lower edge case.

For example, A may be chosen to be approximately 0.37. It has been shown empirically by testing several hundred different distributions that evaluating the edge slope with a weight of $A\approx0.37$ (e.g., $A=0.37\pm20\%$, or $\pm15\%$, or $\pm10\%$) yields optimum control limits with respect to a tradeoff between occurrence of false alarms and too early control actions.

FIG. 8 illustrates a specific example of a (non-normal) sample data distribution with $(\Delta Pu23/\Delta Pu12)=0.4$ and $(\Delta P123/\Delta P112)=0.1$. Thus, the sample data distribution meets the condition $0.1\leq(\Delta P23/\Delta P12)\leq10$ both for the upper and lower edge cases. For example, the control limits UCL and LCL (see middle part of FIG. 8) may then be calculated in accordance with equations 5 and 6 by $$UCL=Pu2+D\times(0.37\times\Delta Pu12+(1-0.37)\times\Delta Pu23)$$

$$LCL=P12+D\times(0.37\times\Delta P112+(1-0.37)\times\Delta P123). \qquad \text{(equation 7)}$$

In other cases, for sample data distributions having "extreme" edge progressions meeting the condition $(\Delta P23/\Delta P12)<1/x$ or $(\Delta P23/\Delta P12)>x$, with x being equal to or greater than, e.g., 5 or 8 or 10 (with 10 being the example used above), it has been found that A should no longer be chosen as a constant value. Rather, the control limit computation is improved by choosing A as a non-constant function of $(\Delta P23/\Delta P12)$, written as $$A\left(\frac{\Delta P23}{\Delta P12}\right).$$

Differently stated, it has been shown empirically by testing several hundred different sample data distributions that if $(\Delta P23/\Delta P12)$ is outside a range between a lower and an upper threshold, e.g. 0.1 and 10, the weight A becomes a function of the ratio itself. Equations 5 and 6 can then be written as $$CL(EEM) =$$ (equation 8)

$$Ps + D \times \left( A\left(\frac{\Delta P23}{\Delta P12}\right) \times \Delta P12 + \left(1 - A\left(\frac{\Delta P23}{\Delta P12}\right)\right) \times \Delta P23 \right).$$

The function $$A\left(\frac{\Delta P23}{\Delta P12}\right)$$

starts at A (i.e. at the constant A which is, e.g., at 0.37) for $$\frac{\Delta P23}{\Delta P12} = x \text{(e.g. 10)}.$$

It then decreases to, e.g., about 0.15 at $$\frac{\Delta P23}{\Delta P12} = 20$$

to stay constant again thereafter, i.e. at about 0.15 for $$\frac{\Delta P23}{\Delta P12} > 20,$$

for example.

In other words, it has been shown empirically by testing several hundred distributions that optimum control limits with respect to a tradeoff between too many false alarms and too early control actions can also be calculated by equations 5 and 6 for sample data distributions which are far off from normal distributions (e.g. even outside the interval $$0.1 \le \frac{\Delta P23}{\Delta P12} \le 10 \biggr).$$

Calculation of control limits for those sample data distributions can be done simply by gradually lowering the value of A (e.g. 0.37) in an intermediate range of $$10 \le \frac{\Delta P23}{\Delta P12} \le 20$$

and then keeping A constant at a lower value (e.g. 0.15) again for $$\frac{\Delta P23}{\Delta P12} > 20,$$

for example.

In addition, it has been shown that a minimum sample size of, e.g., about 100 sample data values is recommendable for the "edge evaluation method" as disclosed herein. As the method, by construction, evaluates only about 30% of the sample data, the minimum sample size may be higher than in other SPC methods with minimum sample sizes of 20-30. It has been shown empirically by testing several hundred different distributions of small sample sizes that the calculated control limits can be improved for smaller sample sizes (e.g., between 100 and 1000 sample data values) if D is optionally defined as a function of sample size n, i.e., as D(n).

FIG. 9 illustrates a number of different edge progression types of sample data distributions. The edge progression types are referred to as NORMAL, STEEP, STEP, SHARP, NEEDLE and CONSTANT.

The edge progression type NORMAL represents an edge progression of distributions which are at least somewhat similar to normal distributions with respect to their edge shape. Such distributions are characterized by $\Delta P12 \ne 0$ and $\Delta P23 \ne 0$ and $\Delta P10 \ne 0$, wherein P0 equals the sample data value at 50% of the cumulative sample data distribution, i.e. the median of the sample data distribution.

The NORMAL edge progression type subdivides into three subcases:

The first subcase is a Gaussian-like sample data distribution. As already mentioned, this case is characterized by $\Delta P12 \approx \Delta P23 \approx \Delta P10 \approx s$. In this subcase the control limits may be calculated by equations 4.1 to 4.3 for the upper control limit and by equations 4.4 to 4.6 for the lower control limit or by equations 5, 6 and 7.

The second subcase is the baseline subcase which includes non-Gaussian-like sample data distributions still meeting the edge progression condition $0.1 \le (\Delta P23/\Delta P12) \le 10$. The control limits can be calculated by equations 4.1 to 4.3 for the upper control limit and by equations 4.4 to 4.6 for the lower control limit or by equations 5, 6 and 7. In this case A is a constant weight of, e.g., 0.37.

The third subcase is the extreme subcase, in which $(\Delta P23/\Delta P12)$ is smaller than a lower threshold (e.g. 0.1) or greater than an upper threshold (e.g. 10). The control limits can be calculated by equation 8 (with A being a function of $(\Delta P23/\Delta P12)$).

The characterization of sample data distributions in terms of their edge progression by calculating differences between percentiles and characterizing edge region(s) of the sample data distribution on the basis of the calculated differences reveals edge types in which at least one difference of percentiles is equal to (approximately) 0. These edge types are characterized by:

STEEP: $\Delta P12=0$, $\Delta P23 \ne 0$, $\Delta P10 \ne 0$

STEP: $\Delta P12=0$, $\Delta P23=0$, $\Delta P10 \ne 0$

SHARP: $\Delta P12 \ne 0$, $\Delta P23=0$, $\Delta P10 \ne 0$

NEEDLE: $\Delta P12 \ne 0$, $\Delta P23 \ne 0$, $\Delta P10=0$, $\Delta P23/\Delta P12 > 5$ CONSTANT: $\Delta P12=0$, $\Delta P23=0$, $\Delta P10=0$.

The calculation of control limits for these types of edge progressions is not considered herein. Empirically, it has been found that the vast majority of practical sample data distributions are of the type NORMAL, while only a small portion of sample data distributions are of the edge types STEEP, STEP, SHARP, NEEDLE or CONSTANT. These non-NORMAL sample data distributions may be handled in other ways that are not part of this disclosure. They can be identified by the edge progression evaluation method and handled adequately thereafter.

FIG. 10 is a flowchart illustrating stages of an exemplary computer-implemented method of monitoring a process including edge progression characterization. FIG. 10 illustrates the discrimination between the edge progression type NORMAL and the edge progression types STEEP, STEP, SHARP, NEEDLE and CONSTANT.

At S1 a sample data distribution is obtained, compare S1 of FIGS. 5 and 7.

Classification of the edge progression into edge progression types is done at COND by checking whether $\Delta P12 \neq 0$ and/or $\Delta P23 \neq 0$ and/or $\Delta P10 \neq 0$.

If the condition $\Delta P12 \neq 0$ and $\Delta P23 \neq 0$ and $\Delta P10 \neq 0$ is met (YES), the process proceeds to S2. Alternatively, if at least one of $\Delta P12$, $\Delta P23$ and $\Delta P10$ is zero (NO), the control limits of these sample data distributions are not calculated or are calculated using other procedures not described herein (S3).

Differently stated, the edge progression condition $\Delta P12 \neq 0$ and $\Delta P23 \neq 0$ may, e.g., be used as a necessary condition for the method S1, S2 to be executed. That is, the method is carried out only if $\Delta P12 \neq 0$ and $\Delta P23 \neq 0$.

Figure 11A:
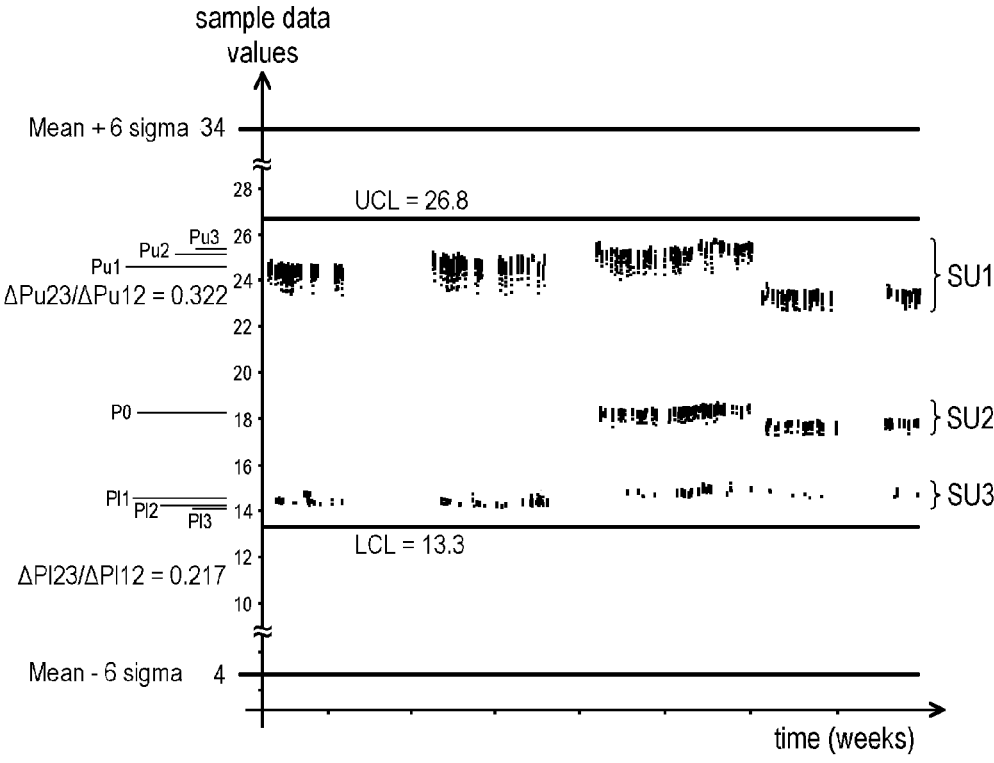
FIG. 11A is a diagram representing a multimodal sample data distribution by showing sample data values over time and control limits derived by conventional statistical process control (SPC) and by SPC in accordance with the disclosure.

FIG. 11A is a diagram representing a multimodal sample data distribution over time. The Y-axis represents the measured sample data values (in arbitrary units). The X-axis represents the time, e.g. in units of hours or days or weeks etc. The sample data is collected by, e.g., three sampling units denoted by sampling units SU1, SU2 and SU3. As apparent from FIG. 11A, the sampling units SU1, SU2, SU3 deliver sample data with systematic offsets between each other. Furthermore, for example, sampling unit SU2 does not have the same activity period as sampling units SU1 and SU3, and sampling units SU1 and SU2 have an offset from a certain point in time, for example. Multiple sample data values from a given sampling unit at a given time are represented by data points arranged in the vertical direction.

In this example 7500 data points (sample data values) have been collected. The characterization of the upper edge of the sample data distribution reveals $\Delta Pu23/\Delta Pu12=0.322$, and the characterization of the lower edge of the sample data distribution reveals $\Delta P123/\Delta P112=0.217$. Hence, the exemplary sample data distribution belongs to the type NORMAL and the subcase "baseline" of FIG. 9.

The upper and lower control limits UCL, LCL are calculated with equation 7, i.e. with A=0.37, D=4 and the starting point percentile Ps=Pu2=97.77%-percentile for the upper control limit and Ps=P12=2.28%-percentile for the lower control limit.

The computation of control limits yields UCL=26.8 and LCL=13.3. These control limits compare to a conventionally calculated UCL of 34 and a conventionally calculated LCL of 4. Conventional calculation was based on calculating the mean value M and the standard deviation s, modelling the obtained sample data values by a normal distribution and applying equation 1 for upper and lower control limit calculation based on the "6 sigma limit" approach.

As apparent from FIG. 11A, the upper and lower control limits UCL, LCL calculated in accordance with the disclosure are closer to the sampling data values obtained by sampling units SU1, SU2 and SU3. As a result, these control limits allow earlier control actions to be taken without undue likelihood of false alarms. On the other hand, the conventionally calculated "6 sigma limits" are not suitable for SPC for the example sample data distribution.

Figure 11B:
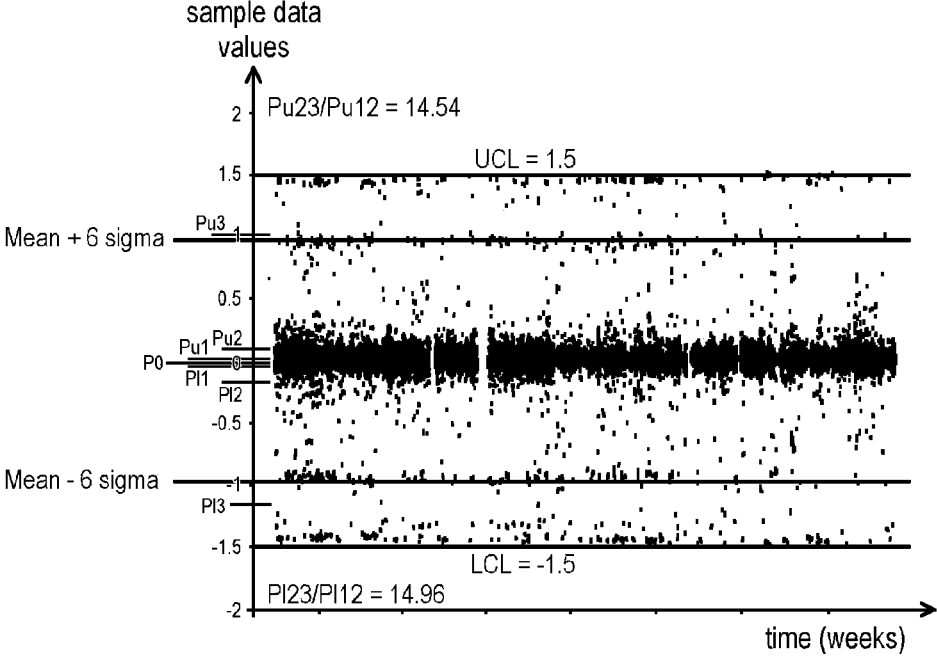
FIG. 11B is a diagram representing a sample data distribution with a strong edge spread and, and showing control limits derived by conventional statistical process control (SPC) and by SPC in accordance with the disclosure.

FIG. 11B is a diagram showing a sample data distribution with a strong edge spread. As known in the art, it is difficult to obtain meaningful control limits from such data distributions. The conventional calculation of control limits ("6-sigma limits") leads to UCL and LCL with a false alarm rate that is far too high.

In this example 117265 data points (sample data values) have been collected. The characterization of the upper edge of the sample data distribution reveals $\Delta Pu23/\Delta Pu12=14.54$, and the characterization of the lower edge of the sample data distribution reveals $\Delta P123/\Delta P112=14.96$. Hence, the exemplary sample data distribution belongs to the type NORMAL and the subcase "extreme" of FIG. 9. The control limits are calculated with equation 8, yielding UCL=1.475 (rounded to 1.5) and LCL=−1.464 (rounded to −1.5). In equation 8, $$A\left(\frac{\Delta P23}{\Delta P12}\right) \approx 0.27$$

was used. It can be seen that the control limits calculated in accordance with the disclosure fit the distribution of the sample data exactly, yielding a false alarm rate of about $10^{-5}$.

As mentioned above, the edge progression evaluation approach described herein is, by construction, "robust" to fluctuations of the sample data distribution in its inner region. In addition, the approach is "robust" to outliers. Unlike conventional model based SPC methods, outliers need not be flagged or excluded prior to SPC processing. In general, for example, it is possible to avoid or skip any data changing preprocessing such as, e.g., data pre-cleaning, data correction based on a-priori knowledge, data filtering, outlier extraction, etc., of sample data. However, processing (i.e. conversion) of raw data to generate the sample data by, for example, deriving features such as mean, sigma, minimum, maximum may optionally be performed. Such processing of raw data to derive sample data may be performed "blindly" without biasing the processing on a model or on assumptions. Further, as mentioned above, pre-evaluation of the sample data for appropriate characterization of the edge type, as shown in conjunction with FIGS. 9 and 10, and/or sample size input for small sample sizes if D should be chosen as a function of the sample size n, i.e. D(n), may optionally be performed. Pre-evaluation of sample data does not change the sample data but can be used to adjust the computing of the control limits (see e.g. FIG. 10).

Figures 12, 13, 14:
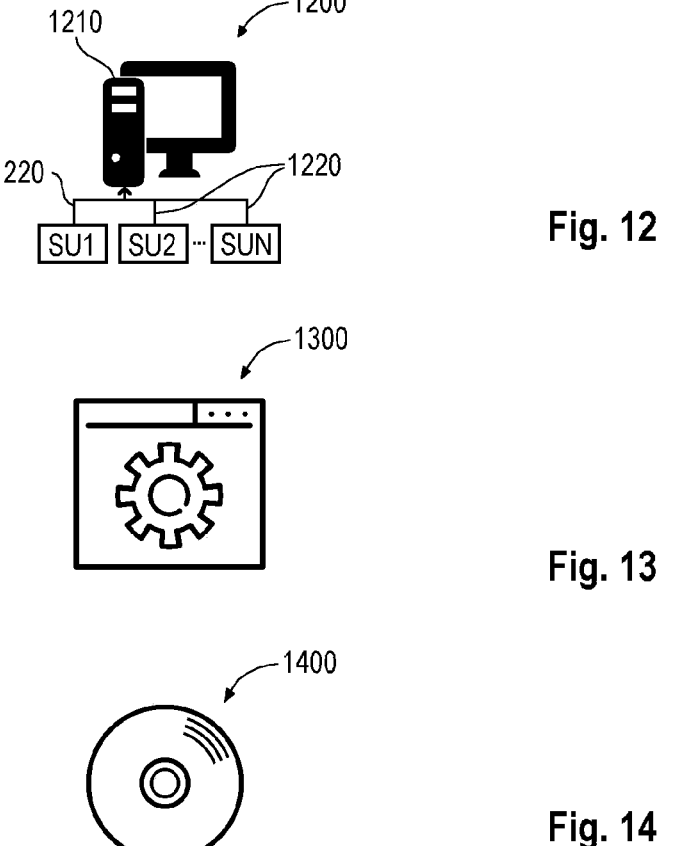
FIG. 12 illustrates an exemplary data processing apparatus and an exemplary system including a plurality of sampling units and the data processing apparatus.
FIG. 13 is an exemplary computer program product.
FIG. 14 is an exemplary non-transitory computer-readable storage medium.

Referring to FIG. 12, an example of a system 1200 includes a data processing apparatus 1210, e.g. computer, and a plurality of sampling units SU1, SU2, . . . , SUN, wherein N is a positive integer. The sampling units SU1, SU2, . . . , SUN may be connected via data links 1220 to the data processing apparatus 1210. Each sampling unit SU1, SU2, . . . , SUN generates and/or collects sample data which is provided to the data processing apparatus 1210. The data processing apparatus 1210 includes means for carrying out a computation method as described above. The system 1200 may be distributed over a plurality of entities in a local or global network. The data links 1220 may, e.g., comprise local or global network links and/or data storage means for data transport.

In all examples, the sampling units SU1, SU2, . . . , SUN (e.g. sensors, measurement units, etc.) may monitor an industrial manufacturing process. The sample data may be based on measurements of process parameters in manufacturing equipment such as, e.g., physical quantities (e.g., temperature, pressure, position, etc.) and/or manufacturing equipment settings (e.g. measured throttle valve setting etc.).

The monitored process may, e.g., be a process of fabricating semiconductor devices, e.g. semiconductor wafers, semiconductor chips and/or packaged semiconductor devices. The monitored process may, e.g., be a FEOL (front-end-of-line) manufacturing process or a BEOL (back-end-of-line) manufacturing process. However, manufacturing processes in a variety of other industrial technologies may be monitored.

The calculated control limits may be used to control the manufacturing process. Process control may comprise controlling the process parameters by varying the manufacturing equipment settings based on the calculated control limits. Further, maintenance intervals, manufacturing starts, manufacturing stops, product quality measures, yield measures etc. may be determined and/or performed based on the calculated control limits.

The system 1200 may be configured to perform processes as described above (e.g., control of manufacturing equipment settings). To this end, the system 1200 may include means for performing these processes.

FIG. 13 illustrates an exemplary computer program product 1300. The computer program product is configured to cause a computer to carry out any method of calculating control limits as mentioned above when executed by the computer, e.g. data processing apparatus 1210.

FIG. 14 illustrates, by way of example, a non-transitory computer-readable storage medium 1400. The non-transitory computer-readable storage medium 1400 comprises program instructions which, when executed by a computer, cause the computer to carry out any of the methods as described above. The non-transitory computer-readable storage medium 1400 may, e.g., be a solid state data storage medium such as, e.g., a volatile or non-volatile semiconductor storage or optical storage medium. The non-transitory computer-readable storage medium 1400 may be a central storage or may be distributed over a plurality of storage entities in a local or global network. The non-transitory computer-readable storage medium 1400 may allow download of the computer program product 1300 of FIG. 13 onto a data processing apparatus 1210 as shown in FIG. 12.

The following examples pertain to further aspects of the disclosure:

Example 1 is a computer-implemented method of monitoring a process, the method comprises obtaining a sample data distribution, the sample data representing one or more parameters of a process, the sample data being collected by one or a plurality of sampling units; and calculating a control limit based on an evaluation of at least one difference of percentiles near an upper edge of the sample data distribution or a lower edge of the sample data distribution.

In Example 2, the subject matter of Example 1 can optionally include wherein the percentiles near the upper edge of the sample data distribution are greater than a 70%-percentile of the sample data distribution and/or the percentiles near the lower edge of the sample data distribution are less than a 30%-percentile of the sample data distribution.

In Example 3, the subject matter of Example 1 or 2 can optionally include wherein calculating the control limit is not based on modelling the sample data distribution and/or on calculating a mean value and/or a standard deviation of the sample data distribution.

In Example 4, the subject matter of any preceding Example can optionally further include producing a cumulative sample data distribution of the sample data distribution, wherein calculating the control limit is based on an evaluation of the cumulative sample data distribution.

In Example 5, the subject matter of Example 4 can optionally include wherein the percentiles are a p1-percentile and a p2-percentile, wherein p1 and p2 are given percentages, and wherein the p1-percentile is calculated as the sample data value at p1 of the cumulative sample data distribution and the p2-percentile is calculated as the sample data value at p2 of the cumulative sample data distribution.

In Example 6, the subject matter of Example 4 or 5 can optionally include wherein, in an upper control limit case, the cumulative sample data distribution is evaluated only in a region equal to or greater than 70%, and/or, in a lower control limit case, the cumulative sample data distribution is evaluated only in a region equal to or less than 30%.

Example 7 is a computer-implemented method of monitoring a process, the method comprising obtaining a sample data distribution, the sample data representing one or more parameters of a process, the sample data being collected by one or a plurality of sampling units; calculating at least a p1-percentile P1 and a p2-percentile P2 of the sample data distribution, wherein p1 and p2 are given percentages, wherein either, in an upper control limit case, p1<p2 and p1≥70%, or, in a lower control limit case, p1>p2 and p1≤30%; calculating an edge evaluation measure based on at least one difference of percentiles P2−P1; and calculating a control limit based on a sum of a ps-percentile Ps of the sample data distribution and the edge evaluation measure, wherein ps is a given percentage.

In Example 8, the subject matter of Example 7 can optionally include wherein, in the upper control limit case, ps 80%, or, in the lower control limit case, ps 20%.

In Example 9, the subject matter of any Example 7 or 8 can optionally include wherein P1, P2 and Ps are calculated as the sample data values at p1, p2 and ps, respectively, of the cumulative sample data distribution.

In Example 10, the subject matter of any Example 7 to 9 can optionally further include calculating a p3-percentile P3 of the sample data distribution, wherein p3 is a given percentage with p3>p2 in the upper control limit case, or p3<p2 in a lower control limit case; and calculating the edge evaluation measure additionally based on an edge percentile difference P3− P2.

In Example 11, the subject matter of Example 10 can optionally include wherein the edge evaluation measure is based on a weighted sum of the edge percentile differences $\Delta P12=P2-P1$ and $\Delta P23=P3-P2$.

In Example 12, the subject matter of Example 11 can optionally include wherein the edge evaluation measure is $EEM=A\times\Delta P12+(1-A)\times\Delta P23$, with A being a weight between 0 and 1.

In Example 13, the subject matter of Example 12 can optionally include wherein the control limit CL is calculated by $CL(EEM)=Ps+D\times EEM$, with D being a control limit adjustment factor.

In Example 14, the subject matter of any Example 11 to 13 can optionally include wherein p1, p2, p3 are chosen such that $\Delta P23/\Delta P12=1$ for a normal distribution.

In Example 15, the subject matter of any Example 11 to 14 can optionally include wherein A is a constant value at least for sample data distributions meeting the condition $1/x$ ($\Delta P23/\Delta P12$) x, with x being equal to or greater than 5.

In Example 16, the subject matter of Example 15 can optionally include wherein A is approximately 0.37.

In Example 17, the subject matter of any Example 12 to 14 can optionally include wherein A is a non-constant function of ($\Delta P23/\Delta P12$) at least for sample data distributions meeting the condition $(\Delta P23/\Delta P12)<1/x$ or $(\Delta P23/\Delta P12)>x$, with x being equal to or greater than 5.

In Example 18, the subject matter of any Example 15 to 17 can optionally include wherein x is approximately 10.

In Example 19, the subject matter of any Example 11 to 18 can optionally further include classifying an edge progression comprising checking whether or not $\Delta P12\approx0$ and $\Delta P23\approx0$ is met, and carrying out the method of any of Examples 10 to 17 only if $\Delta P12\approx0$ and $\Delta P23\approx0$.

Example 20 is a data processing apparatus comprising means for carrying out the method of any of the preceding Examples.

Example 21 is a system including one or a plurality of sampling units configured to collect sample data representing one or more parameters of a process; and a data processing apparatus comprising means for carrying out the method of any of the Examples 1 to 19.

Example 22 is a computer program comprising program instructions which, when the program is executed by a computer, cause the computer to carry out the method of any of Examples 1 to 19.

Example 23 is a non-transitory computer-readable storage medium comprising program instructions which, when executed by a computer, cause the computer to carry out the method of any of Examples 1 to 19.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptions or variations of the specific embodiments discussed herein. Therefore, it is intended that this invention be limited only by the claims and the equivalents thereof.

What is claimed is:

1. A computer-implemented method of monitoring controlling a process, the method comprising:

obtaining a sample data distribution, the sample data representing one or more parameters of the process, the sample data being collected by one or a plurality of sampling units;

calculating a control limit based on an evaluation of at least one difference of percentiles near an upper edge of the sample data distribution or a lower edge of the sample data distribution; and controlling the one or more process parameters by varying one or more manufacturing equipment settings based on the calculated control limit.

2. The method of claim 1, wherein the percentiles near the upper edge of the sample data distribution are greater than a 70%-percentile of the sample data distribution and/or the percentiles near the lower edge of the sample data distribution are less than a 30%-percentile of the sample data distribution.

3. The method of claim 1, wherein calculating the control limit is not based on modelling the sample data distribution and/or on calculating a mean value and/or a standard deviation of the sample data distribution.

4. The method of claim 1, further comprising:

producing a cumulative sample data distribution of the sample data distribution, wherein calculating the control limit is based on an evaluation of the cumulative sample data distribution.

5. The method of claim 4, wherein the percentiles are a p1-percentile and a p2-percentile, wherein p1 and p2 are given percentages, and wherein the p1-percentile is calculated as the sample data value at p1 of the cumulative sample data distribution and the p2-percentile is calculated as the sample data value at p2 of the cumulative sample data distribution.

6. The method of claim 4, wherein in an upper control limit case, the cumulative sample data distribution is evaluated only in a region equal to or greater than 70%, and/or, in a lower control limit case, the cumulative sample data distribution is evaluated only in a region equal to or less than 30%.

7. A computer-implemented method of controlling a process, the method comprising:

obtaining a sample data distribution, the sample data representing one or more parameters of the process, the sample data being collected by one or a plurality of sampling units;

calculating at least a p1-percentile P1 and a p2-percentile P2 of the sample data distribution, wherein p1 and p2 are given percentages, wherein either in an upper control limit case, p1<p2 and p1≥70%, or in a lower control limit case, p1>p2 and p1≤30%;

calculating an edge evaluation measure based on at least one difference of percentiles P2−P1;

calculating a control limit based on a sum of a ps-percentile Ps of the sample data distribution and the edge evaluation measure, wherein ps is a given percentage; and controlling the one or more process parameters by varying one or more manufacturing equipment settings based on the calculated control limit.

8. The method of claim 7, wherein, in the upper control limit case, ps≥80%, or, in the lower control limit case, ps≤20%.

9. The method of claim 7, wherein P1, P2 and Ps are calculated as the sample data values at p1, p2 and ps, respectively, of a cumulative sample data distribution produced from the sample data distribution.

10. The method of claim 7, further comprising:

calculating a p3-percentile P3 of the sample data distribution, wherein p3 is a given percentage with p3>p2 in the upper control limit case, or p3<p2 in a lower control limit case; and calculating the edge evaluation measure additionally based on an edge percentile difference P3−P2.

11. The method of claim 10, wherein the edge evaluation measure is based on a weighted sum of the edge percentile differences $\Delta P12=P2-P1$ and $\Delta P23=P3-P2$.

12. The method of claim 11, wherein the edge evaluation measure is $EEM=A\times\Delta P12+(1-A)\times\Delta P23$, with A being a weight between 0 and 1.

13. The method of claim 12, wherein the control limit (CL) is calculated by $CL(EEM)=Ps+D\times EEM$, with D being a control limit adjustment factor.

14. The method of claim 12, wherein p1, p2, p3 are chosen such that $\Delta P23/\Delta P12=1$ for a normal distribution.

15. The method of claim 12, wherein A is a constant value at least for sample data distributions meeting the condition $1/x\leq(\Delta P23/\Delta P12)\leq x$, with x being equal to or greater than 5.

16. The method of claim 15, wherein A is approximately 0.37.

17. The method of claim 12, wherein A is a non-constant function of $(\Delta P23/\Delta P12)$ at least for sample data distributions meeting the condition $(\Delta P23/\Delta P12)<1/x$ or $(\Delta P23/\Delta P12)>x$, with x being equal to or greater than 5.

18. The method of claim 17, wherein x is approximately 10.

19. The method of claim 11, further comprising:

classifying an edge progression comprising checking whether or not $\Delta P12\neq 0$ and $\Delta P23\neq 0$ is met; and carrying out the method only if $\Delta P12\neq 0$ and $\Delta P23\neq 0$.

20. A system comprising:

one or a plurality of sampling units configured to collect sample data representing one or more parameters of a process;

a data processing apparatus configured to obtain a distribution of the sample and calculate a control limit based on an evaluation of at least one difference of percentiles near an upper edge of the sample data distribution or a lower edge of the sample data distribution; and a process control apparatus configured to control the one or more process parameters by varying one or more manufacturing equipment settings based on the calculated control limit.

21. A non-transitory computer readable storage medium storing a computer program operable to implement a method of controlling a process, the computer program comprising:

program instructions to obtain a sample data distribution, the sample data representing one or more parameters of the process, the sample data being collected by one or a plurality of sampling units;

program instructions to calculate a control limit based on an evaluation of at least one difference of percentiles near an upper edge of the sample data distribution or a lower edge of the sample data distribution; and program instructions to control the one or more process parameters by varying one or more manufacturing equipment settings based on the calculated control limit.

* * * * *